United States Patent [19]

Thompson et al.

[11] 3,805,741

[45] Apr. 23, 1974

[54] CROWD GATE

[75] Inventors: Duncan M. Thompson, Riverside; Lyle L. Needham, Bellwood, both of Ill.

[73] Assignee: Babson Bros. Co., Oak Brook, Ill.

[22] Filed: Apr. 11, 1973

[21] Appl. No.: 350,114

[52] U.S. Cl. ................ 119/20, 119/14.04, 119/155
[51] Int. Cl. ............................................ A01k 29/00
[58] Field of Search .......... 119/14.01, 14.03, 14.04, 119/20, 155; 17/1 A

[56] References Cited
UNITED STATES PATENTS

| | | | |
|---|---|---|---|
| 2,092,440 | 9/1937 | Cain | 119/14.04 |
| 3,282,250 | 11/1966 | Cain | 119/14.04 |
| 3,460,515 | 8/1969 | Page et al. | 119/14.04 |

Primary Examiner—Louis G. Mancene
Assistant Examiner—J. N. Eskovitz
Attorney, Agent, or Firm—Hofgren, Wegner, Allen, Stellman & McCord

[57] ABSTRACT

A crowd gate for urging animals, for example, cows, toward a desired position as, for example, a milking parlor. The crowd gate includes a carriage which is adapted to ride on an overhead track and which swingably mounts a depending gate which may come into contact with an animal standing on a surface underlying the rails. A motor is operative to drive the carriage and, thus, the gate, along the rails until such time as the gate encounters an animal at which time the motor is de-energized for a predetermined time. After the time has elapsed, the motor is again energized until an animal is again engaged. The system also includes a means for elevating the gate and for reversing the carriage motors so that the carriage in the gate may be returned to a starting position.

10 Claims, 7 Drawing Figures

CROWD GATE

BACKGROUND OF THE INVENTION

This invention relates to crowd gates and, more particularly, to automated crowd gates for use in herding animals.

The most pertinent prior art known to the applicant includes U. S. Pat. Nos. 409,222; 3,223,070; 3,282,250; and Czechoslovakian Patent 110,525.

Farming, like virtually any other segment of the economy, has seen an increasing trend towards automation. One particular facet of farming given a great deal of attention in the trend towards automation is that of dairying.

Various factors have required the dairy farmer to continually increase the size of his herd while making every effort to minimize overhead in order to maintain the profitability of the operation.

Ordinarily, one might expect that the increasing of herd size would result in an increase in labor cost, but a number of developments have assisted in maintaining the overhead, including labor costs, at a reasonable level. For example, there is commercially available, milking equipment that will automatically sense when each quarter of a cow has been milked out and cease the milking operation on that quarter. There is also equipment available for automatically preparing a cow for milking as well as equipment which, by and large automatically, will guide a prepared cow to a milking stall, hold the same until all four quarters have been milked out, and thereafter release the cow from the stall to return to the pasture or the like.

such equipment works very well for its intended purpose but occasionally, maximum efficiency is not realized because of one or more balky animals within the herd. For example, in those operations wherein automatic preparation equipment is included, should a cow refuse to enter a preparation stall, time is wasted and the efficiency of the operation decreased. Similarly, in those operations which are less sophisticated, efficiency will be decreased if a cow refuses to enter a milking stall.

Such problems have been attempted to be solved through the use of so-called "crowd gates" which are operative to move behind a herd of cows in a walkway leading to a preparation stall or a milking stall or the like and encounter the rearwardmost animals in the stall and urge them forwardly to press against forwardmost cows. When such occurs, the forwardmost cow or cows generally will wish to relieve the pressure of contact with the remainder of the herd and move into the desired position. Thus, such gates have, in general terms, proved to be successful. However, most suffer from several operating deficiencies in terms of simplicity of structure, reliability of operation, lack of appropriate safety features which may result in injury to a cow or cows when the apparatus malfunctions, and lack of sophistication in terms of the ability to perform their intended function with a minimum of gadgetry and manual control.

SUMMARY OF THE INVENTION

It is the principal object of the invention to provide a new and improved crowd gate system for use in herding animals to a desired position as, for example, a preparation stall or a milking stall in a dairying operation. More specifically, it is an object of the invention to provide such a crowd gate which is simple in construction, reliable in operation, includes a number of safeguards to preclude injury to animals in the herd and which requires a minimum of manual control during its operation.

An exemplary embodiment of the invention achieves the foregoing objects in a construction including a pair of elongated rails which are adapted to be mounted in an elevated relationship on opposite sides of an animal walkway. A carriage is provided to ride on the rails and the same includes a front end and a rear end. A motor is mounted on the carriage and is energizable to drive the carriage According to the preferred embodiment, the front end of the carriage journals a rotary shaft which, in turn, at its ends, mounts wheels in engagement with the rails.

For safety purposes, the cylindrical peripheries of the wheels in engagement with the rails are formed of a material having a sufficiently high coefficient of friction so as to positively drive the carriage and yet a sufficiently low coefficient of friction so as to slip when the carriage encounters an obstruction and the motor continues to drive the shaft due to a malfunction or the like.

The carriage mounts a depending crowd gate which is adapted to extend across the width of the animal walkway. The crowd gate is pivotally mounted to depend from the front end of the carriage. The rear end of the carriage mounts a winch system, including a cable extending to the gate. The winch system may be energized bi-directionally to raise or lower the gate. Normally, the gate will be in a lowered position when it is in use to crowd animals forwardly on the walkway but will be raised to an elevated position well above the walkway when the carriage is to be returned to its starting position.

A control circuit including animal sensing means associated with the gate is provided. The control circuit causes the carriage to advance until such time as the gate encounters an animal and thereafter stops. Preferably, a time delay circuit is included in the control circuit so that the carriage will be reenergized after once stopping after some predetermined time has elapsed, provided, however, that the animals have moved forwardly of the gate and are not in contact therewith when the time period has elapsed.

Various limit switches are provided to control movement of the gate between its raised and lowered position as well as to de-energize the carriage drive motor whenever the carriage is at one end or the other of its path of movement.

Other objects and advantages will become apparent from the following specification taken in conjunction with the accompanying drawings.

DESCRIPTION OF THE PREFERRED EMBODIMENT

Figure 1:
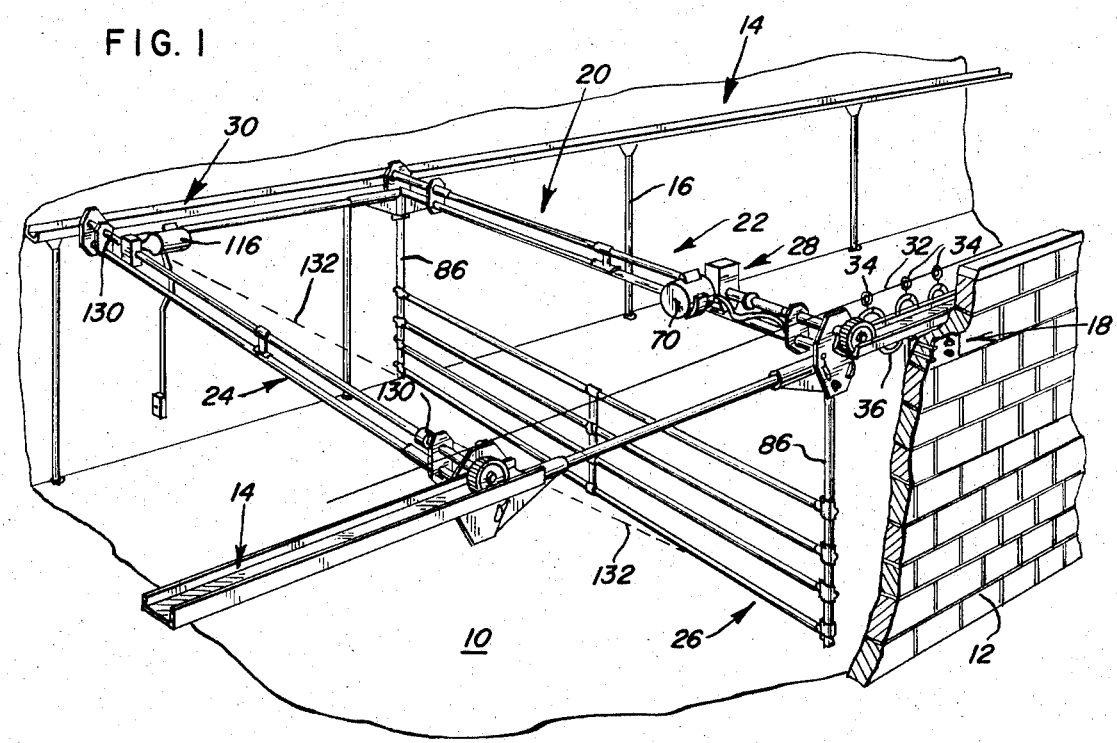
FIG. 1 is a perspective view of an animal walkway provided with a crowd gate made according to the invention.

An exemplary embodiment of the invention is illustrated in FIG. 1 in connection with a walkway 10 in a building having a wall 12. The invention includes a pair of elongated rails, generally designated 14, which are elevated above the walkway 10 on opposite sides thereof. The rails 14 may be supported in an elevated position as a particular situation requires. For example, posts 16 may be employed for the purpose. Alternately, they may be mounted to a wall such as the wall 12 by mounting brackets generally designated 18. Riding on the rails 14 is a carriage, generally designated 20, which extends therebetween and includes a front end, generally designated 22, and a rear end, generally designated 24.

Depending from the front end 22 of the carriage 20 is a crowd gate, generally designated 26 which is adapted to engage the rearwardmost animals in a herd to the right of the assemblage as viewed in FIG. 1.

The carriage 20 mounts drive means, generally designated 28, at its front end 22 for advancing the carriage 20 on the rails 14 in either direction. In addition, the carriage mounts winch means, generally designated 30, at its rearwardmost end and having a connection to the crowd gate 26 and operable to raise and lower the same. Finally, in general terms, the system includes an elongated cable 32 mounting a plurality of hangers 34 slidable on the cable. The hangers in turn mount an elongated electrical cable 36 for providing power to the drive means 28 and the winch means 30.

Figure 2:
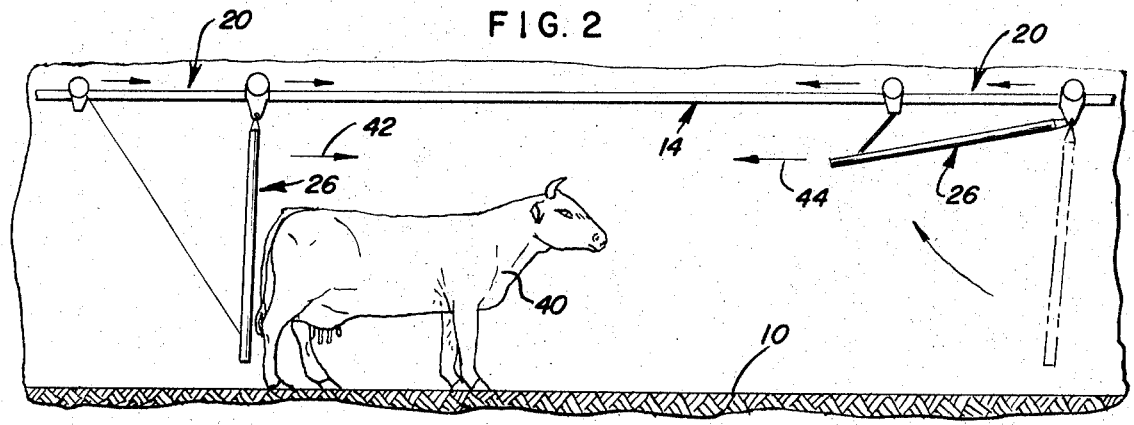
FIG. 2 is a somewhat schematic side elevation of a walkway employing the crowd gate.

Turning now to FIG. 2, the general mode of operation of the crowd gate will be described. An animal, such as a cow 40 is standing on the walkway 10 with the carriage 20 and gate 26 to the rear thereof. As the carriage 20 is advanced in the direction of an arrow 42, the gate 26 will encounter the rear of the cow 40 and apply pressure to the same to drive the cow to the right towards some predetermined position such as a preparation stall or a milking stall. As will be described in greater detail hereinafter, a control circuit for the crowd gate 20 is such that once the cow 40 is encountered, further movement of the carriage 20 will be halted until a predetermined time has elapsed. Thereafter, it will again be moved in the direction of the arrow 42 until such time as it again encounters a cow 40.

FIG. 2 also illustrates the mode of operation of the system once the carriage 20 has reached the forwardmost limit of its travels in the direction of the arrow 42. Specifically, the winch 30 (FIG. 1) is operative to raise the crowd gate 26 to the solid line position shown at the right of FIG. 2 and the drive means 28 energized to drive the carriage 20 in the direction of an arrow 44 until such time as the carriage 20 attains its starting position. By reason of the elevated position of the gate 26, no injury will occur should an animal inadvertently be located on the walkway 10 to the rear of the crowd gate 26 when the return operation is initiated.

Figure 3:
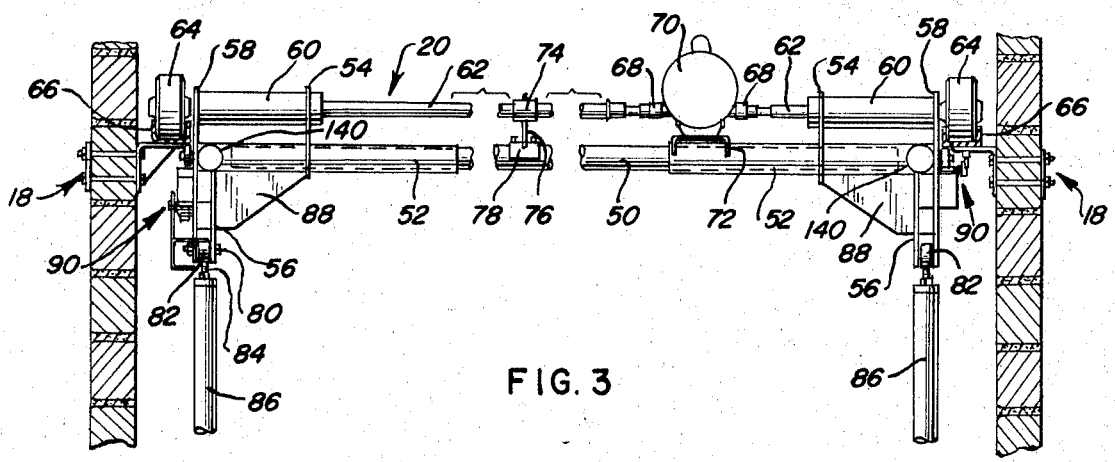
FIG. 3 is an enlarged, elevation of the front end of the crowd gate.

Turning now to FIGS. 3–6, inclusive, the carriage and gate structure will be described in greater detail. With reference specifically to FIG. 3, the front end 22 of the carriage is defined by a tubular cross member 50. The ends of the cross member 50 are received in sleeves 52 on opposite sides of the carriage 20. This arrangement is preferable since it allows the width of the carriage to be easily adjusted to suit a particular installation by varying the length of the cross member 50. Suitable means secure one end of the cross member 50 in one of the sleeves 52 while the other end of the cross member 50 is loose within the other sleeve 52 to permit lateral change in carriage dimension should the rails come out of parallel alignment.

The sleeves 52 each mount an inner, upwardly extending plate 54, a relatively inner, depending plate 56 and an outer plate 58 which extends both above and below the sleeve 52. The upper extension of the plate 58 as well as the plate 54, mount horizontal bearing sleeves 60. The bearing sleeves 60 receive ends of respective shafts 62 which extend outwardly of the plates 58 to be fixedly secured to wheels 64.

The rails 14 are defined by upwardly opening channels 66 which, in turn, receive the wheels 64. That is, the cylindrical periphery of each of the wheels 64 is in driving engagement with the base of an associated one of the channels 66 defining the rails 14.

The shafts 62 are connected via flexible couplings 68 to the output shaft of an electric drive motor 70 of the bi-directional type and having internal reduction gearing. The drive motor 70 is mounted on one of the sleeves 52 by a horizontally extending base plate 72.

Thus, it can be appreciated that when the drive motor 70 is energized, the wheels 64 will be driven to drive the carriage along the tracks 14. The direction of such movement will, of course, be controlled by the direction of energization of the bi-directional motor 70.

As generally alluded to previously, it is desirable to provide a safety feature in the event that there is a malfunction in the apparatus. To this end, the peripheral surfaces of the wheel 64 are formed of a material having a sufficiently high coefficient of friction that they will relatively positively engage the base of the channel 66 defining the tracks 14 so as to drive the carriage. However, the material is selected to have a sufficiently low coefficient of friction that in the event movement of the carriage is obstructed for any reason and the motor 70 continues to be energized, the wheels 74 will slip in the channels 66. One suitable material for the formation of the cylindrical surfaces of the wheel 64 is neoprene.

As can be appreciated from FIG. 3, by reason of the fact that the motor 70 is mounted on one of the sleeves 52, the shaft 62 extending towards the opposite sleeve 52 will have a substantially longer length than the other of the shafts 62. For reliable operation, it is preferable to provide a bearing 74 for journaling the longer one of the shafts 62. The bearing 74 is mounted on an upstanding tongue 76 secured to a semi-cylindrical yolk 78 which is in turn mounted on the cross member 50.

The downward extension of each of the plates 58 and the plates 56 include aligned apertures (not shown) at their lower ends for receiving bolts 80 defining a horizontal pivot axis for the gate 26. More specifically, a sleeve 82 is journaled on the bolts 80 between the plates 56 and 58 and it, in turn, is secured as by an adjustable, threaded connection 84 to the upper end of a post 86 defining the upright side of the respective one of the ends of the gate 26. Thus, it will be appreciated that the gate 86 is mounted for pivotal movement about a horizontal axis between a lowered position and a raised position, both of which are illustrated in FIG. 2.

Finally, various reinforcing plates, such as plates 88 and control circuit components, generally designated 90, may be employed in connection with the plates 56, 58 and the rails 66 as will be described in greater detail hereinafter.

Figure 4:
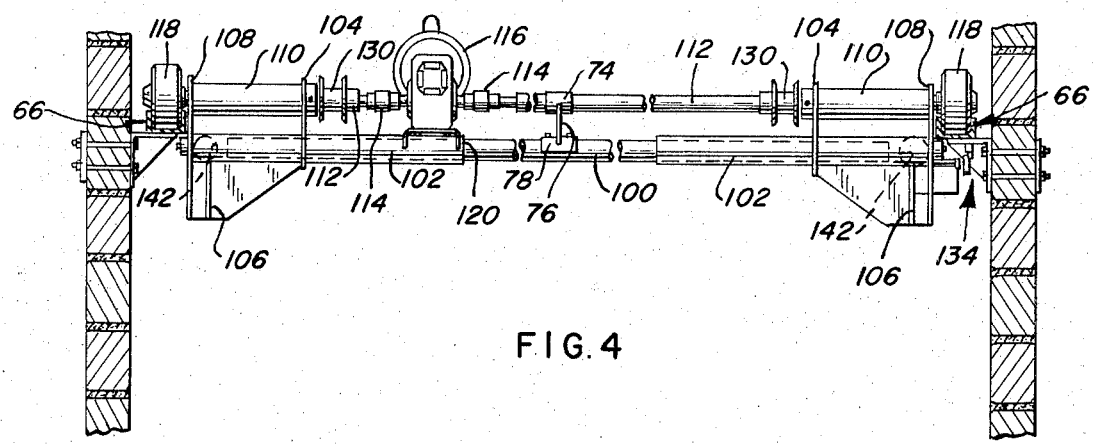
FIG. 4 is a view of the assemblage similar to that shown in FIG. 3 of the rear end of the crowd gate.

With reference now to FIG. 4, the rear end 24 of the carriage 20 will be described in greater detail. The same includes a tubular cross member 100 having its end received in respective sleeves 102 which, in turn, mount respective plates 104, 106 and 108 in a manner generally corresponding to the interrelationship between the sleeves 52 and the plates 54, 56 and 58.

Sleeves 110 are interposed between the plates 104 and 108 and journal ends of shafts 112 coupled by flexible couplings 114 to the output shaft of a reversible, electrical motor 116 having internal reduction gearing. Again, the arrangement is generally along the lines of that described in connection with the front end of the carriage. However, unlike the shafts 62, the shafts 112 are not secured to wheels. Rather, rear wheels 118 for the carriage are provided and are journaled on associated shafts in the sleeves 110 without connection to the shafts 112. Thus, the wheels 118 are nondriven wheels.

The motor 116 is mounted on a base plate 120 which, in turn, is secured to one of the sleeves 102. As can be seen from a comparison of FIGS. 3 and 4, the motor 70 is mounted on the right-hand sleeve 52 while the motor 116 is mounted on the left-hand sleeve 102. As can also be seen from FIG. 1, the motor 70 is directed inwardly of the carriage 20 as is the motor 116.

Again, one of the shafts 112 is longer than the other and to this end, a bearing 74 and support elements 76 and 78 identical to those described in connection with FIG. 3 are provided to support the longer one of the shafts 112.

Each of the shafts 112, near its outermost end, supports for rotation therewith, a reel 130. As shown in dotted lines in FIG. 1, a pair of wire ropes 132 extend from the lowermost extremity of the gate 26 to the reels 130. Their ends are, by any suitable means, secured to the reels 130 such that when the motor 116 is energized to rotate the shafts 112 and the reels 130, the wire ropes 132 will either be taken up on the reels or payed off of the reels to raise or lower the gate 116 about its pivot axis, respectively.

The plates 108, like the plates 58, may also mount control elements, generally designated 134, to be described in greater detail hereinafter.

It will be recognized that with the exception of the provision of the reels 130 and the fact that the wheels 118 are not driven, the rear end assemblage of the carriage 20 is identical to the front end assemblage 22. This allows more economical manufacture in that more tooling costs are involved and a lesser parts inventory is required.

Figure 5:
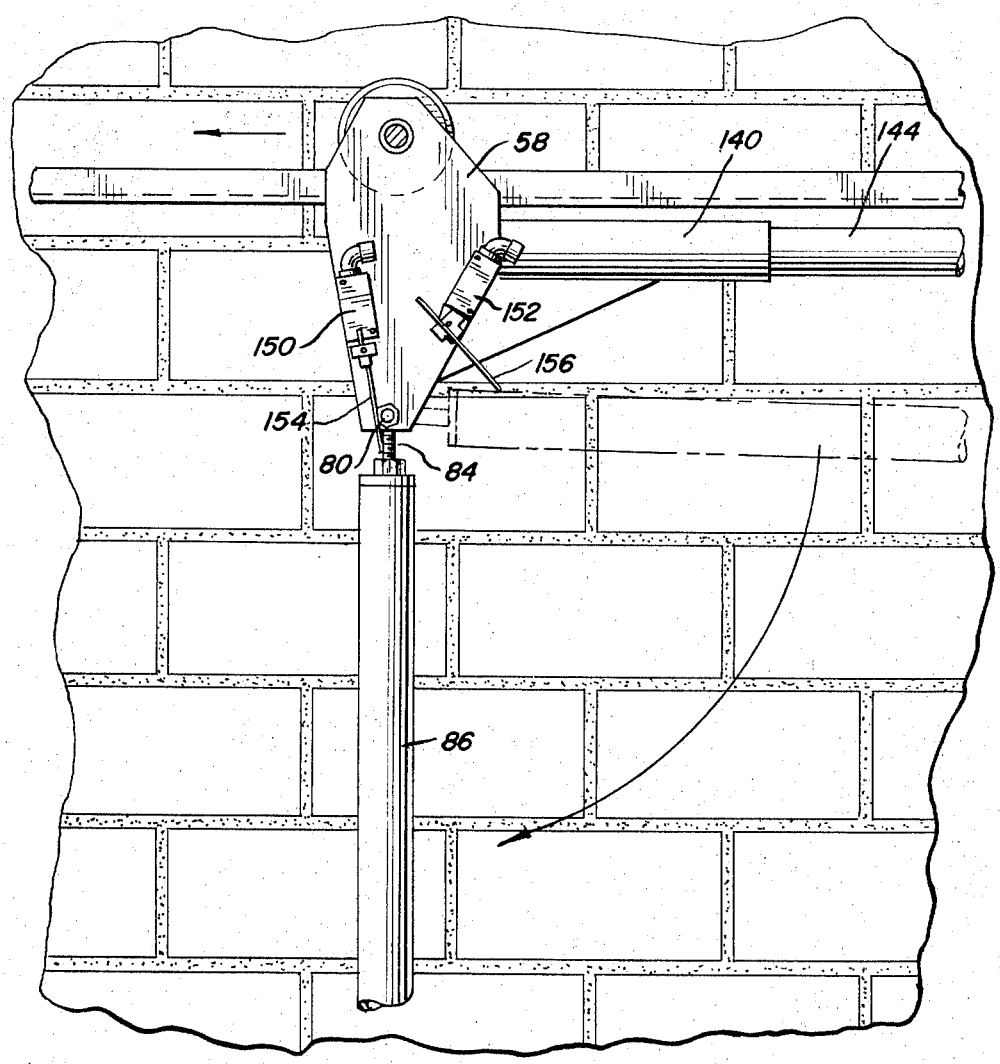
FIG. 5 is an enlarged, fragmentary elevation of a portion of the carriage and gate mechanism.

The carriage 20 is completed by opposed side members. As seen in FIGS. 3 and 5, each of the sleeves 52 mounts a rearwardly extending sleeve 140, while as viewed in FIGS. 4 and 6, each of the sleeves 102 mounts a forwardly extending sleeve 142. Aligned ones of the sleeves 140 and 142 receive tubular side members 144 which may be held in place by any suitable securing means (not shown). This construction allows the length of the carriage to be regulated by suitably choosing the length of the tubular side member 144. This adjustment is desirable in that the height of the carriage 20 above the walkway 10 may vary from installation to installation due to physical requirements posed by the building in which it is located and/or the type of cows in the herd. Since, as is evident from FIG. 2, it is desirable that the lowermost end of the gate 26, when in its raised position, be somewhat close to the rear end 24 of the carriage 20, the length of the carriage may vary appropriately as the height of the gate 26 is varied.

If desired, the plates 58 and 108 may journal rollers 146 which underlie the base of the channels 66 defining the rails 14 so as to positively locate the carriage 20 thereon. This precludes the carriage 20 from being derailed under most circumstances.

Figure 6:
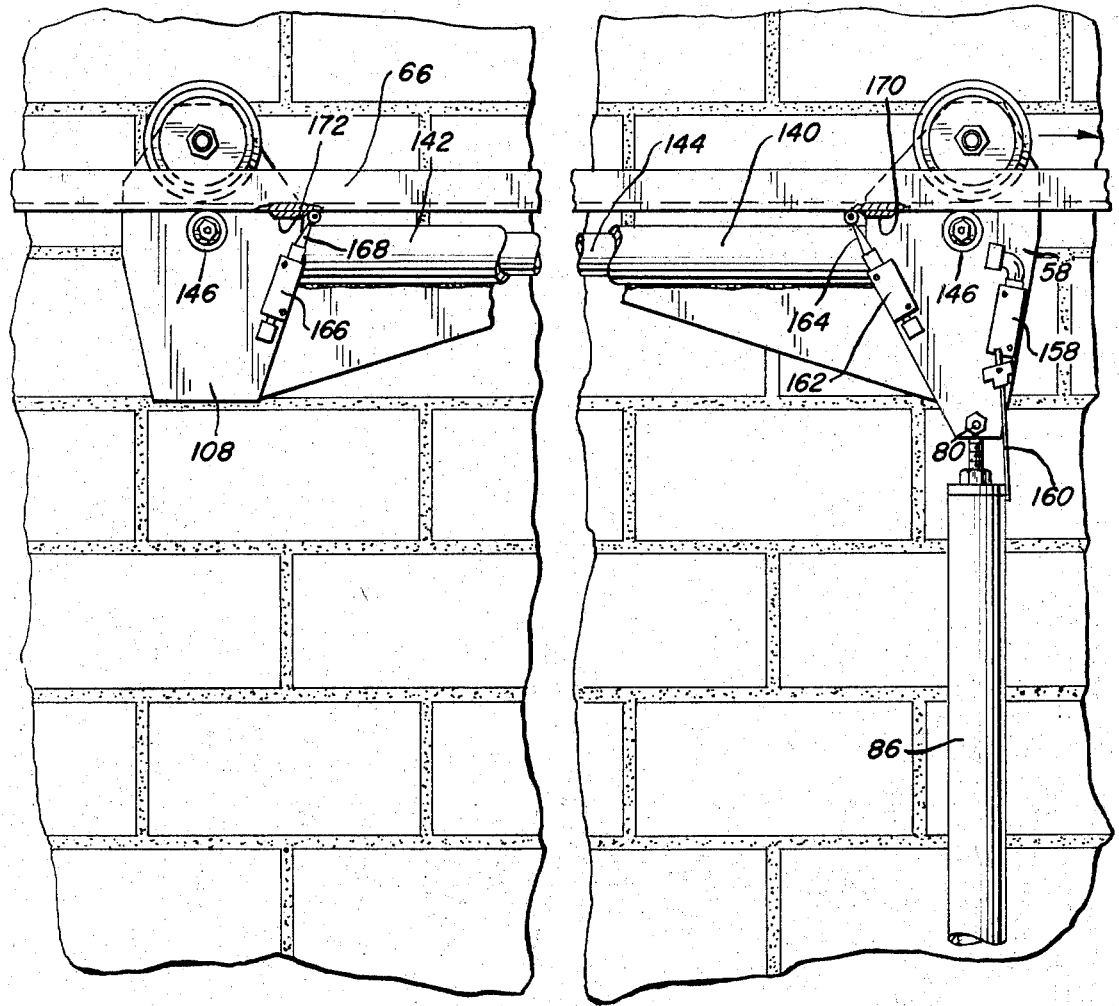
FIG. 6 is an enlarged, fragmentary elevation of another portion of the gate.

With reference to FIGS. 5 and 6, various electrical control components will be described. With reference specifically to FIG. 5, one of the plates 58 mounts switches 150 and 152 having actuators 154 and 156 respectively. Preferably, provision is made so that the location of the switches 150 and 152 on the plate 58 may be adjusted.

As will be seen, the switch 150 serves a limit switch function in a control circuit. Its actuator, as seen in FIG. 5, is in contact with the threaded member 84 secured to one of the gate posts 86 and thus will be tripped depending upon the position of the gate 86. Specifically, the switch 150 is to determine when the gate has been lowered to its lowermost position.

The switch 152 serves a similar limit function. Its actuator 156 may be contacted by the post 86 when the gate is raised to its upper position to sense when the raising operation should be terminated.

With reference now to FIG. 6, another one of the plates 58 mounts a limit switch 158 having an actuator 160 positioned to be engaged by one of the gate posts 86 when the same is rotated rearwardly about the pivot defined by bolt 80. As can be seen in FIG. 6, the spacing is such that some pivotal movement is allowed before the actuator 160 is contacted to trip the switch. The switch 158 serves as an animal sensing means associated with the gate and will be tripped when the gate engages an animal in the herd while the carriage 20 is moving. That is, when the gate engages the animal, it will pivot rearwardly as the carriage continues to move and trip the switch 158.

The plate 58 also mounts a switch 162 having an actuator 164 while the plate 108 mounts a similar switch 166 having an actuator 168.

Secured to the underside of the channels 66, at forwardmost and rearwardmost locations, are depending switch tripping cams. At the forwardmost end of the rails 66 a cam 170 is provided, while at the rearwardmost end of the rails 66 a cam 172 is provided. The arrangement is such that when the carriage reaches the forward end of the track, the cam 170 will be engaged by the actuator 164 of the switch 162 to trip the same. Similarly, when the carriage reaches the rearwardmost end of the track, the cam 172 will be engaged by the actuator 178 to trip the switch 166. The switches 162 and 166 again serve limit functions to stop movement of the carriage when it has reached the end of its travel in either direction.

Figure 7:
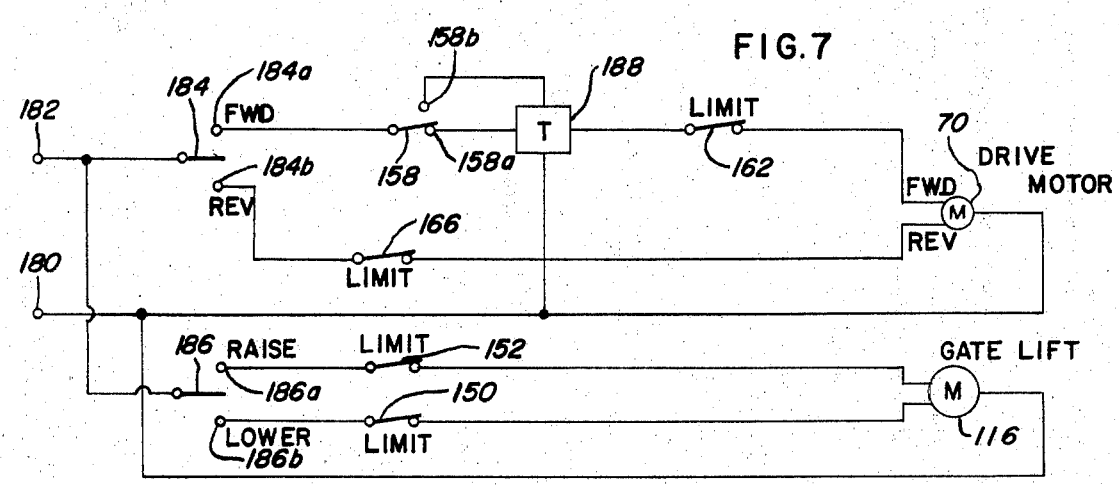
FIG. 7 is an electrical schematic of one preferred form of control system for the crowd gate.

Turning now to FIG. 7, a control circuit employing the switches 150, 152, 158, 162 and 166 as well as the motor 70 and 116 is illustrated. As mentioned, both the motors 70 and 116 are bi-directional and, accordingly, have a single connection to one side of a source of power applied to a terminal 180. The other side of the source of power is connected to a terminal 182. The terminal 182 is connected to first and second manually operable control switches 184 and 186. The switch 184 forms part of the control circuit for the drive motor 70 and is a three-position switch. It may be closed through a contact 184a to cause the carriage to move forwardly or, it may be closed to a contact 184b to drive the carriage rearwardly. An intermediate contact is not connected and when the switch 184 is on such a contact, the motor 70 will be de-energized.

The contact 184a is connected to the switch 158 which will be closed through a contact 158a whenever the gate 86 is in its lowermost position. However, when an animal is contacted, the switch 158 will shift to be closed through a contact 158b which is connected to an adjustable, electrical timer 188. The timer 188 includes a return to the terminal 180 as well as a connection via the switch 162 to one winding of the motor 70 which, when energized, will cause the same to drive the carriage in a forward direction.

The contact 184b is simply connected via the switch 166 to the reverse winding of the motor 70.

Returning to the timer 188, the same is of a conventional construction and includes an internal switch which is normally open but, will close after a predetermined time period has elapsed once the timer has been energized. This switch is connected in series with the contact 158a and the limit switch 162.

Turning now to the switch 186, the same may be closed through a contact 186a or a contact 186b or a not shown intermediate contact. When closed through the contact 186a, the motor 116 will be energized to raise the gate, while when closed through the contact 186b, the motor 116 will be energized to lower the gate. The limit switches 152 and 150 are respectively opposed in series with the contacts 186a and 186b and the forward and reverse windings of the motor 116 respectively.

The operation of the device is generally as follows. The switch 184 may be closed through the contacts 184a to cause the carriage to be energized to move forwardly along the walkway. When the gate 26 encounters an animal in the herd, it will pivot somewhat rearwardly until such time as the switch 158 is moved from its contact 158a to the contact 158b. This will energize the timer 188. After a predetermined time has elapsed, the internal switch within the timer 188 will close to again cause the motor 70 to drive the carriage forwardly, providing that, in the meantime, the switch 158 has returned to its contact 158a. If such has not occurred, the motor 70 will not be energized until such time as the switch 158 is returned to its contact 158a.

This sequence will occur repetitively until the carriage is advanced to the forwardmost point of its travel at which time the limit switch 162 will be tripped to open the circuit to the forward winding of the motor 70.

The user of the device will then observe that the carriage has reached the forwardmost end of its travel and may close the switch 184 through the contact 184b to reverse the carriage and to drive the same to its rearwardmost position at which time, the limit switch 166 will be tripped to an open position to halt further energization of the drive motor 70 in a reverse direction.

The operation of the switch 186 manually to raise or lower the gate is believed apparent from the description of the operation of the motor 70, it being understood that the limit switches 152 and 150 function similarly to the limit switches 162 and 166.

While not shown herein, in some instances it may be desirable to provide an interlock between the reversing circuit for the motor 70 and the gate raising circuit for the motor 116 such that the motor 70 cannot be energized to drive the carriage rearwardly until such time as the gate has been raised, or at least is not energized.

Generally, the timer 188 will be of an adjustable type so that a variety of time delays can be provided. Usually, an adjustment range from zero to five minutes will be sufficient.

It is also preferable that the switch 158 be adjustable in terms of allowing a variable gate swing to control the system. Gate weight may also be changed to suit various crowding requirements.

From the foregoing, it will be appreciated that a crowd gate made according to the invention fulfills the previously stated objects thereof and is considerably superior to those constructions heretofore known.

We claim:

1. A crowd gate for use in herding animals comprising: a pair of elongated rails adapted to be mounted in an elevated relationship on opposite sides of an animal walkway; a carriage extending between and riding on said rails, said carriage having a front end and a rear end; a motor mounted on said carriage and energizable to drive said carriage back and forth on said rails; a gate pivotally affixed to the front end of said carriage and depending therefrom, said gate being adapted to engage an animal on the walkway; means on said carriage for pivoting said gate rearwardly thereon to elevate the same whereby said gate may pass over a animal on the walkway; and means for controlling said motor including an animal sensing means associated with said gate, a timing device and an interconnected control circuit responsive to the engagement of said gate with an animal for de-energizing said motor for a predetermined time and thereafter re-energizing said motor until an animal again is encountered by said gate.

2. Apparatus according to claim 1 wherein said means for pivoting said gate rearwardly on said carriage includes a selectively operable motor.

3. Apparatus according to claim 1 further including limit sensing means at opposite ends of at least one of said rails for de-energizing said motor to preclude further movement of said carriage toward the respective end of said rails when the carriage is at the respective end of said rails.

4. Apparatus according to claim 1 wherein said motor is operative to drive said carriage along said rails by means of wheels engaging said rails and driven by said motor, said means having a rail engaging surface formed of a material having a coefficient of friction sufficiently high so as to provide positive drive power and sufficiently low to allow slippage when movement of said carriage is obstructed while said motor is energized.

5. Apparatus according to claim 1 wherein said means for pivoting said gate rearwardly on said carriage includes a motor driven winch mounted on said carriage and a flexible cable extending therefrom and connected to a lower portion of said gate.

6. Apparatus according to claim 5 further including a control circuit for said motor driven winch, said control circuit including means for causing said winch to be driven bi-directionally, means for de-energizing said motor driven winch when said gate is at a first position depending from said gate carriage after being driven by said motor driven winch, and means for de-energizing said motor driven winch when said gate is in a position approximately parallel to said carriage after being pivoted rearwardly by said motor driven winch.

7. Apparatus according to claim 1 wherein said carriage further includes structural elements interconnecting said front end and said rear end, said front end and said rear end being substantially identical one to the other.

8. Apparatus according to claim 7 wherein means are provided whereby the width of said carriage may be selectively adjusted upon installation.

9. A crowd gate for use in herding animals comprising: elongated rail means adapted to be mounted in an elevated relationship relative to an animal walkway; a carriage riding on said rail means; a motor mounted on said carriage and energizable to drive said carriage back and forth on said rail means; a gate affixed to said carriage and depending therefrom, said gate being configured to substantially span the walkway and being adapted to engage an animal on the walkway; and means for controlling said motor including an animal sensing means associated with said gate, a timing device and an interconnected control circuit responsive to the engagement of said gate with an animal for de-energizing said motor for a predetermined time and thereafter re-energizing said motor until an animal again is encountered by said gate.

10. Apparatus according to claim 9 wherein said animal sensing means comprises switch means associated with said gate and operable to energize said timing device when said gate engages an animal, said timing device being arranged in circuit with said motor to de-energize said motor when said timing device is energized.

* * * * *